Oct. 18, 1938.  H. C. A. POTEZ  2,133,668
WING FOR AIRCRAFT
Filed Dec. 30, 1937  2 Sheets-Sheet 1
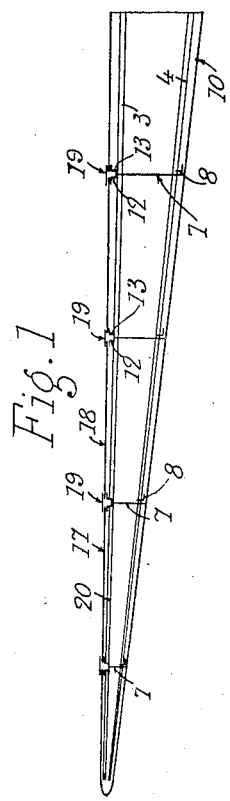
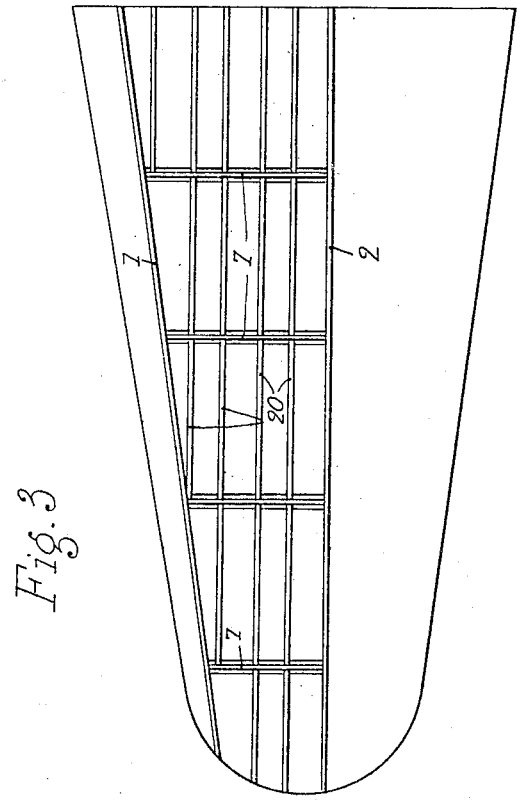
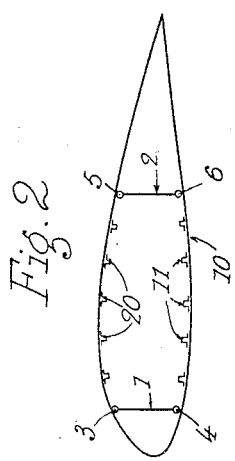
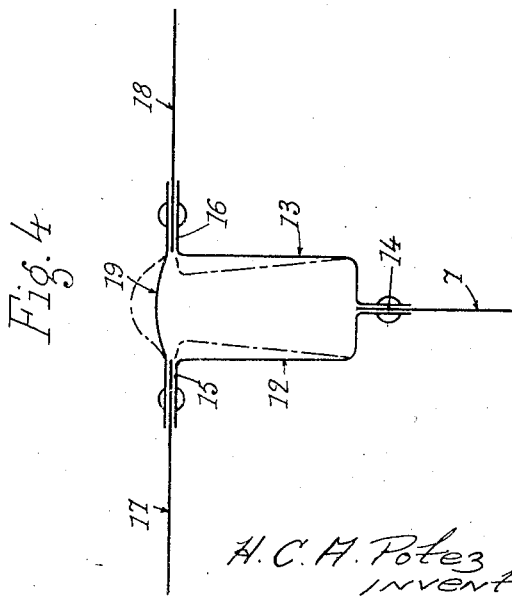
H. C. A. Potez
INVENTOR
By: Glascock Downing & Seebold
Attys.

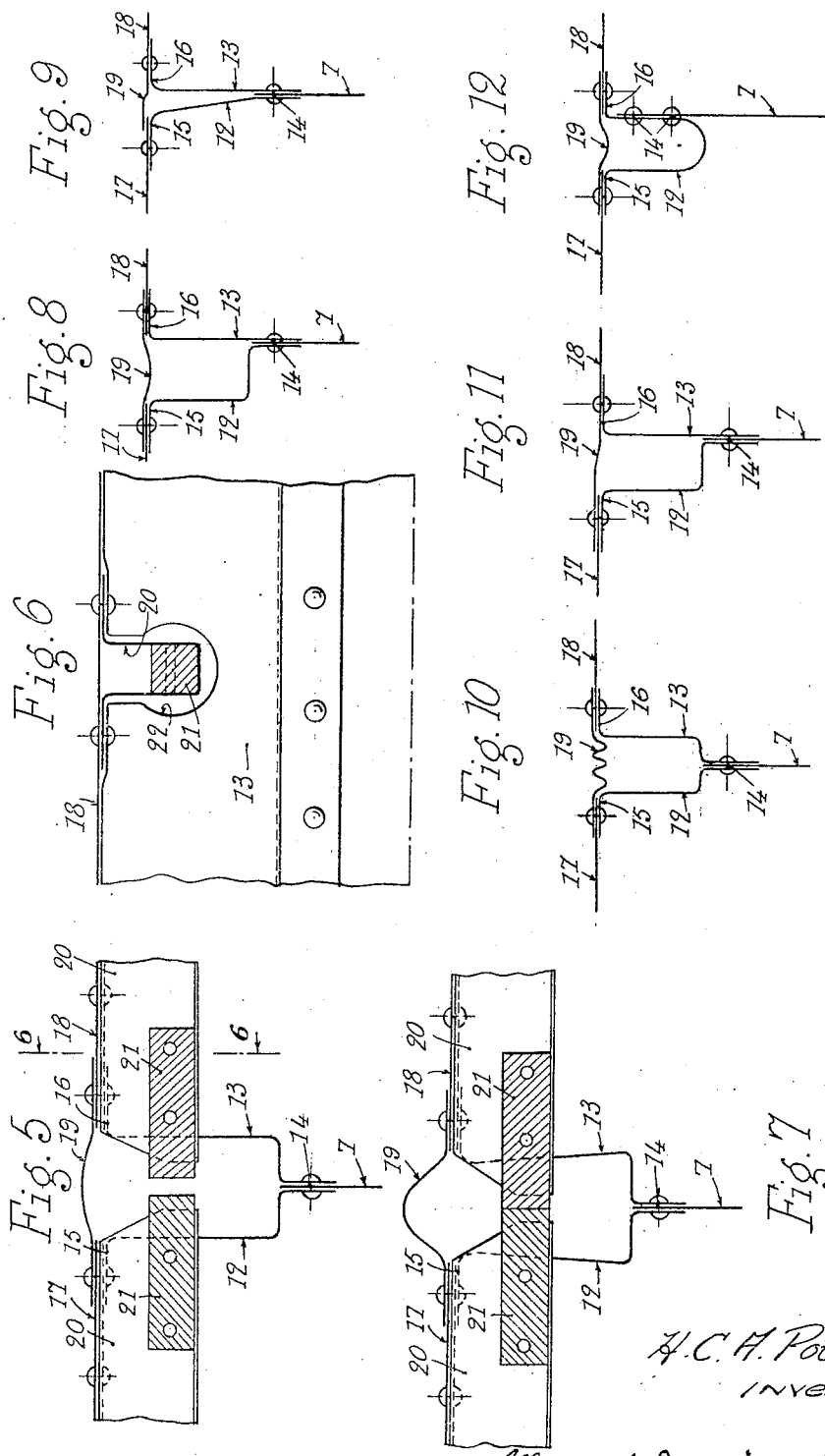

Patented Oct. 18, 1938

2,133,668

UNITED STATES PATENT OFFICE 2,133,668

WING FOR AIRCRAFT

Henry Charles Alexandre Potez, Meaulte, France

Application December 30, 1937, Serial No. 182,571
In France March 25, 1937

6 Claims. (Cl. 244—123)

This invention has for its object to provide a wing for aircraft, which consists essentially of two longitudinal girders or spars, the height of which is equal to that of the profile of the wing, of cross struts the outline of which coincides with the profile of the wing and connecting the longitudinal girders, of a covering for the upper side of the wing, said covering comprising a plurality of panels which are interrupted at the passage of each cross strut, said panels being stiffened by longitudinal rails which are also interrupted at the passage of each cross strut and are connected to said struts by suitable yielding means and of a covering for the pressure side of the wing, said latter covering being stiffened by longitudinal rails which are continuous or not.

According to a further feature of the invention, said yielding means consists of a channel section member forming a rib cover, which is secured at its base to the upper edge of a cross strut or rib, and the vertical flanges of which are sufficiently elastic to be able to move apart or to come together under the effect of the forces acting upon the wing and are each connected, at one end, to one of the covering panels, and together by an elastic band adapted to close the space existing between said two flanges.

According to a further feature of the invention, the rails for stiffening the panels, which are interrupted at the points adjacent the transverse struts or ribs, are provided at their ends with stops the spacing of which in the idle position, is determined according to the mechanical characteristics of the longitudinal girders and of the covering panels, so that when the whole wing is near its limit of resistance, the said stops having come into contact, the longitudinal girders and the covering will also be near their limit of resistance, even though their respective unit values for the strain are different.

This construction permits of obtaining, for an aeroplane wing, the maximum resistance to bending stresses. In fact, when the wing is subjected to the stresses due to the upward pressure of the air, it is subject to deformation, and all parts located above the neutral bending line will be compressed and must hence shorten. But, while the cap strips of the two longitudinal girders are adapted to shorten without buckling, until their unit value of the strain T comes near the value of the breaking by simple compression, owing to their compact section and to their connection with the other parts of the wing, the same is not true for the covering or the stiffening rails, if these are continuous. In fact, the said covering and rails consists of thin parts the unit value for the strain T' of which is much less than T. But as the said covering is secured to the longitudinal girders, it is obliged to shorten as much as their cap strips, and even more, as these parts are farther from the neutral line.

The resistance of the wing to bending strains due to the pressure of the air will thus be limited, in the case of continuous rails and coverings, not by the value of the strain T on the longitudinal girders, but by the value of the strain T' on the covering, which is much less than the preceding.

On the contrary, with a wing in conformity with the invention, the first part of the bending of the longitudinal girders corresponds to a compression of the elastic connection devices between the said rails and the cross struts, as the covering part is not subject to bending stress, and it is only when the stops of two adjacent rails come into contact, that the covering begins to bend until it reaches its unit value T' for the strain.

As the spacing between the stops in the idle position is so calculated that the covering part will only reach its value T' for the strain when the cap strips of the longitudinal girders reach their own value T for the strain, it will thus result that the resistance to bending offered by an aircraft wing according to the invention is no longer limited by the unit value of the strain on the said rails and on the covering, but by the much greater value of the cap strips of the longitudinal girders.

In the accompanying drawings, which are given solely by way of example:

Fig. 1 is a longitudinal section of a wing according to the invention.

Fig. 2 is a corresponding cross-section.

Fig. 3 is a corresponding plan view.

Fig. 4 shows in cross-section and on a larger scale, a detail of the elastic connecting device for the covering.

Fig. 5 is a view on a larger scale and in longitudinal section, showing the connection between a longitudinal rail and a cross strut.

Fig. 6 is a section on the line 6—6 of Fig. 5.

Fig. 7 is a view similar to Fig. 5, with the stops in contact.

Figs. 8, 9, 10, 11 and 12 are views similar to Fig. 4, showing various modifications of the device for the elastic connection of the covering.

In the embodiment shown in Figs. 1 to 7, the wing consists of two longitudinal girders 1 and 2, whose height is equal to the height of the wing section and which comprise cap strips 3, 4, 5 and 6. The girders 1 and 2 are joined together by cross struts or ribs 7 the outline of which coincides with the profile of the wing. The said ribs are connected at their lower ends by means of angles 8 or like devices, to the face of the covering of the pressure side 10 of the wing which is stiffened by longitudinal rails 11 which may be continuous or not. At their upper ends, the ribs 7 are connected to the covering of the upper side of the wing by means of an elastic device forming a rib cover, as shown in Fig. 4.

The said device consists of two section bars 12 and 13 having a certain elasticity in the longitudinal direction of the wing, so that they may readily be deformed without exceeding their elastic limit, said bars are connected together at 14 to the web of the cross strut 7 by their lower flange, and they form a channel section, the upper ends 15 and 16 of the two vertical flanges of which are bent over at 90°. The two adjacent panels 17 and 18 of the upper covering are each secured to the corresponding flange of the corresponding section bar, and the two flanges 15 and 16 are then connected together by a band 19 which is sufficiently elastic and the cross section of which commences the deformation which it will take under compression. This band has for its object, on the one hand, to connect the panels 17 and 18 together in order to directly resist the torsion stresses to which the wing may be subject, and on the other hand, to close up the space between the section bars 12 and 13, this space offering prejudice to the aerodynamic qualities of the wing.

The covering panels of the upper part 17—18 are stiffened by longitudinal rails 20 to which they are secured and which are interrupted adjacent the ribs 7. Each of the rails 20 is secured to the upper flange of one of the section bars 12 or 13 by means of a rivet, bolt or weld, which also secures the elastic band 19. A stop 21 is mounted at each end of each rail 20, and a cut-out part 22 of suitable form is provided in the section bars 12—13 to give passage to the ends of the rails 20 and of the stops 21.

In these conditions, when the wing is deformed by bending, each panel 17 or 18 of the upper covering and its rails 20 will maintain their length, thus obliging the upper flanges 15—16 of the section bars 12—13 to come nearer together (Fig. 4) and the band 19 will be deformed. The resulting stress is very small, and the strain upon the covering is practically null, and thus the panels and the rails will not be deformed between the longitudinal girders 1 and 2. If the deformation by the bending of the wing should increase until the stops 21 make contact with one another (Fig. 7) a compression stress will be brought upon the panels 17—18 and the rails 20, and if the deformation continues to increase, this compression stress will finally reach a value corresponding to the unit value T' for the limit strain of the covering. If at this time the value of the strain on the longitudinal girders 1—2 reaches its limit T, this will afford the best conditions of operating for the wing as a whole. This result is obtained by calculating the space $a$ between the stops 21 in the idle position, in such way that the force required to bend the longitudinal girders 1—2 as far as their unit value for the limit strain, shall be equal to the force required to bring the stop-pieces 21 into contact, added to the force necessary to subject the panels 17—18 and the rails 20 to their unit value T' for the limit strain.

It will be observed that by this construction, the resistance to the bending of the wing is no longer limited by the value of the strain on the upper covering, but by the much greater value of the longitudinal girders 1 and 2.

Figs. 8 to 12 represent other possible forms for the section bars 12—13, and the band 19 which may, as observed (Figs. 9 and 11), consist of an extended part of one of the adjacent panels 17 or 18.

Fig. 12 represents the same elastic connecting device, but herein it consists of a single piece of a rounded U shape, 12, which is secured by one of its vertical flanges to the web of the cross strut 7.

Obviously, the invention is not limited to the embodiments herein described and represented, which are given solely by way of example, and in particular, the stop system might simply consist of the two section pieces 12 and 13, which, when bending, will make contact at their upper parts.

Having now described my invention what I claim as new and desire to secure by Letters Patent is:

1. A wing for aircraft comprising in combination two longitudinal girders the height of which is equal to that of the profile of the wing, upper and lower cross struts adapted to connect said longitudinal girders together, the outline of said cross struts coinciding with the profile of the wing, an upper side covering formed by a plurality of panels interrupted adjacent each of said upper cross struts and stiffened by longitudinal rails which are also interrupted adjacent each cross strut, yielding means adapted to connect said panels with said upper cross struts and a pressure side covering provided with longitudinal stiffening means.

2. A wing for aircraft comprising in combination two longitudinal girders the height of which is equal to that of the profile of the wing, upper and lower cross struts adapted to connect said longitudinal girders together, the outline of said cross struts coinciding with the profile of the wing, an upper side covering formed by a plurality of panels interrupted adjacent each of said upper cross struts and stiffened by longitudinal rails which are also interrupted adjacent each cross strut, an open member having substantially a V shape connected at its base to the upper edge of each of said upper cross struts and the flanges of which, which are adapted to yield so as to approach or recede under the action of the stresses acting upon the wing, are each connected at their ends with the adjacent panel of said upper side covering, a yielding band adapted to close up the gap between the two flanges of each of said channel section members, and a pressure side covering provided with longitudinal stiffening means.

3. A wing for aircraft as claimed in claim 1, further comprising stop means carried by the adjacent ends of said rails, said stop means being normally spaced when the wing is not subjected to any aerodynamic stress and being adapted to abut, the spacing of said stop means, in the idle position, being determined according to the mechanical characteristics of the longitudinal girders and of said panels, so that when the wing is near its limit of resistance, said stop means having abutted, said longitudinal girders and said upper covering will also be near their limit of resistance, even though their respective unit values for the strain are different.

4. A wing as claimed in claim 2, in which said open member comprises two section members having such a shape that by assemblage they are adapted to constitute a channel section member.

5. A wing as claimed in claim 2 in which said open member is made of a one piece channel section member and is connected by one of its lateral outer faces to said cross-strut.

6. A wing for aircraft comprising in combination two longitudinal girders the height of which is equal to that of the profile of the wing, upper and lower cross struts adapted to connect said longitudinal girders together, the outline of said cross-struts coinciding with the profile of the wing, an upper side covering formed by a plurality of panels interrupted adjacent each of said upper cross struts, two strips secured at one of their edges to the upper edge of each of said cross-struts and at their other edge to the adjacent panel, said two strips forming substantially a V and a band adapted to close the gaps between the two strips which are secured to one of said cross struts, said band being secured to one of the panels and adapted to slide upon the adjacent panel.

HENRY CHARLES ALEXANDRE POTEZ.